(12) United States Patent
Murata et al.

(10) Patent No.: US 6,337,748 B1
(45) Date of Patent: *Jan. 8, 2002

(54) RELATIONAL FIGURE PRINT CONTROL PROCESSING APPARATUS

(75) Inventors: Noriaki Murata; Nobuhiro Saito; Niro Takase, all of Tokyo (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,072

(22) Filed: Jul. 2, 1998

(30) Foreign Application Priority Data

Nov. 11, 1997 (JP) ............................................. 9-308877

(51) Int. Cl.[7] .............................................. G06F 15/00
(52) U.S. Cl. ......................................... 358/1.4; 358/1.6
(58) Field of Search .......................... 358/1.2, 1.3, 1.6, 358/1.9, 1.5, 1.13, 1.14, 1.15

(56) References Cited

U.S. PATENT DOCUMENTS 5,025,395 A * 6/1991 Nose et al. .................. 364/518
5,818,435 A * 10/1998 Kozuba et al. .............. 345/302
6,046,818 A * 4/2000 Benson ....................... 358/1.18

* cited by examiner

Primary Examiner—Joseph Mancuso
Assistant Examiner—Douglas Tran
(74) Attorney, Agent, or Firm—Staas & Halsey LLP

(57) ABSTRACT

A relational figure print control processing apparatus for displaying and printing figures related to job flowcharts used in the operations management of computer jobs and other types of workflow. This device and method does this so that the relationship between the jobs will be output to users in an easily understandable manner on multiple sheets. The job flowchart is output on several sheets that can be easily combined into a single sheet. To accomplish this easy combining of multiple sheets, lines indicating relationships with other objects are output in a manner in which job hierarchy is easily distinguishable. This is accomplished by determining the positions of the job objects relative to each other and then determining the printing position of the an icon representing a job such that the icon is positioned within the printing area of a printing sheet, and a connection between the first icon and second icon is included within the printing area.

10 Claims, 13 Drawing Sheets

| JOB NAME | DISPLAY SHOWING ADDRESS *LEFT UPPER COORDINATE OF ICON | PRECEDING JOB 1 | PRECEDING JOB 2 | ...... | PRECEDING JOB NAME |
|---|---|---|---|---|---|
| A1 | (A1DX, A1DY) | | | | |
| A2 | (A2DX, A2DY) | A1 | | | |
| A3 | (A3DX, A3DY) | A1 | | | |
| A4 | (A4DX, A4DY) | A1 | | | |
| A5 | (A5DX, A5DY) | A2 | A3 | | |
| A6 | (A6DX, A6DY) | A5 | | | |

FIG. 7

| OBJECT CLASSI-FICATION | PAGE (ROW AND COLUMN NUMBER) * PAGE OF OBJECTS | RELATIVE ADDRESS WITHIN PAGE * LEFT UPPER CO-ORDINATE OF ICON | NUMBER OF LINK LINES | LINK LINE 1 | | ········· | LINK LINE 12 | |
|---|---|---|---|---|---|---|---|---|
| | | | | LINK LINE STARTING ADDRESS | LINK LINE ENDING ADDRESS | | LINK LINE STARTING ADDRESS | LINK LINE ENDING ADDRESS |
| ICON | (1, 1) | (A1PX, A1PY) | 0 | | | | | |
| ICON | (1, 1) | (A2PX, A2PY) | 1 | — | — | | — | — |
| LINK LINE | (1, 1) | — | 1 | ·· | ·· | | — | — |
| ·· | ·· | ·· | ·· | | | ·· | | ·· |

| COLUMN NUMBER | ROW NUMBER | PAGE STARTING POSITION | PAGE ENDING |
|---|---|---|---|
| 1 | 1 | (P1SX, P1SY) | (P1EX, P1EY) |
| 1 | 2 | (P2SX, P2SY) | (P2EX, P2EY) |
| 2 | 2 | (P3SX, P3SY) | (P3EX, P3EY) |

RELATIONAL FIGURE PRINT CONTROL PROCESSING APPARATUS

CROSS-REFERENCE TO RELATED APPLICATIONS

This application is based upon and claims priority of a Japanese Patent Application No. 09-308877 filed Nov. 11, 1997, the contents of which are incorporated herein by reference.

BACKGROUND OF THE INVENTION

1. Field of the Invention

The present invention relates to an apparatus and process for printing figures related to such objects as job flowcharts, and, more particularly, the present invention relates to an apparatus and method for displaying and printing figures related to job flowcharts used in the operations management of computer jobs.

2. Description of the Related Art

In managing the operations of computer jobs, job flowcharts are normally created to show the order of the jobs to be processed and their relationship to the preceding jobs in accordance with predetermined operating and management information. These flowcharts are then shown on a display. An operating manager can look at the displayed job flow and confirm that no errors exist in the created operations management program.

Recently, business systems have become extremely large and the number of jobs that must be shown on a job flowchart has become too many to display in a single picture plane. The operations manager must therefore scroll the picture plane to view those parts which cannot be shown in a single picture plane.

If a job flowchart consists of only two sheets or pages, they can both be displayed on a picture plane. However, if there are many sheets or pages, they should be printed on paper to view the relationships for all job elements in the entire job flow. However, if the job flowchart is printed on paper, an abundance of information involved in the job flowchart can cause it to extend over multiple sheets.

In the prior art, because the data to be shown in the picture plane is printed as it was on the paper, the figures (squares) showing the jobs are spread over multiple sheets, as shown in FIG. 16(A). Also, though the figures (squares) were printed accurately as in FIG. 16(B), one crossing point (linkage) between a job and a line showing a relationship to another job was not printed. Without such a linkage being shown the number of related jobs is unknown. Hence, since the printing of this job flowchart is over multiple pages, important information is missing and the printed job flowchart is in a less understandable form.

In addition, when a job flowchart is printed on paper, because a rectangular area including the entire job flow was printed, the printed job flowchart does not have figures showing the job or lines showing a relationship with other jobs.

Also, if multiple printed sheets are pieced together into one sheet after printing, the entire job flow can be seen, but this involves confirming each relationship among jobs of the output job flow.

Still further, lines that show a relationship with another job use arrows to indicate job hierarchy. However, when piecing together multiple sheets, it is difficult to distinguish between multiple lines with arrows and those without arrows when they are positioned at the same point.

To summarize, several problems are encountered in the prior art. First, when printing a job flowchart over several pages, the printed job flowchart does not have figures showing the job or lines showing a relationship with other jobs. Second, when multiple printed sheets are pieced together into one sheet after printing, a person must confirm each relationship among jobs of the output job flow. Finally, when piecing together multiple pages of a job workflow, it is difficult to distinguish between multiple lines with arrows and those without arrows when they are positioned at the same point.

SUMMARY OF THE INVENTION

An object of the present invention is to provide a relational figure print control processing apparatus so that when printing the related object figures of the job flow on multiple sheets, the relationships between the objects will be output to users in an easily understandable manner. This entails not printing job flowcharts that do not have figures showing the objects as jobs or not having lines showing the relationships with other objects.

It is also an object of the present to print a job flowchart on several sheets that can be easily combined into one sheet. To accomplish this easy combining of multiple sheets, lines indicating relationships with other objects are output in a manner in which job hierarchy is easily distinguishable.

Objects and advantages of the present invention are achieved in accordance with embodiments of the present invention by a relational figure print control processing apparatus which controls printing of a plurality of relational figures over a plurality of printing sheets. These relational figures have a first kind of figure representing an object and a second kind of line figure representing a relationship among several objects. This relational figure control apparatus comprises a predetermining object position unit to determine object position information of a plurality of the first kind of figures so that the first kind of figure is located within a single printing sheet and a connection portion between the first kind of figure and the second kind of line figure is located within the single printing sheet. The relational figure print control processing apparatus also includes a predetermining link line position unit to determine link line position information based on whether a first end of the second kind of line figure is positioned at the corner of the first kind of figure based upon whether another object linked by a second end of the second kind of line figure is higher or lower than the first end of the second kind of figure. A predetermining printing size unit is used to determine a size of a first figure area based upon the size of a single printing sheet and a size of the first kind of figure, and a predetermining printing page unit is used to determine a plurality of print pages based on the object position information, the link line position information, and the size of the first figure area for a two dimensional printing area for each of the plurality of printing sheets.

Further objects and advantages of the present invention are achieved in accordance with embodiments of the present invention by a relational figure print control processing apparatus which controls printing of a plurality of relational figures over a plurality of printing sheets. These relational figures have a first kind of figure representing an object and a second kind of line figure representing a relationship among several objects. This relational figure control apparatus comprises a predetermining object position unit to determine object position information of a plurality of the first kind of figures so that the first kind of figure is located within a single printing sheet and a connection portion between the first kind of figure and the second kind of line figure is located within the single printing sheet. The relational figure print control processing apparatus also includes a predetermining link line position unit to determine link line position information based on whether a first end of the second kind of line figure is positioned at the corner of the first kind of figure based upon whether another object linked by a second end of the second kind of line figure is higher or lower than the first end of the second kind of figure. A predetermining printing page unit is used to determine a plurality of print pages based on the object position information and the link line position information for a two dimensional printing area for each of the plurality of printing sheets.

Further objects of the present invention are achieved by a relational figure print control processing apparatus controlling printing of numerous relational figures over a plurality of printing sheets, where the relational figures include a first kind of figure representing an object and a second kind of line figure representing a relationship among several objects. This relational figure print control processing apparatus comprises a predetermining object position unit to determine positions of a plurality of the first kind of figures so that the first kind of figure is located within a single printing sheet and a connection portion between the first kind of figure and the second kind of line figure is located within the single printing sheet.

In accordance with embodiments of the present invention, the predetermining object position unit determines the position of the first kind of figure, so that the first kind of figure is positioned within a first figure area of the single printing sheet, the first figure area is calculated by deducting size of the first kind of figure from an edge of a printable area of the single printing sheet.

In accordance with embodiments of the present invention, the relational figure print control processing apparatus also includes a setting means for storing a size of the single printing sheet, and a predetermining printing size unit to determine a size of the first figure area based upon the size of the single printing sheet and the size of the first kind of figure.

In accordance with embodiments of the present invention, the relational figure print control processing apparatus also includes a setting means for storing a size of the first kind of figure, and a predetermining printing size unit to determine the size of the first figure area based upon the size of the single printing sheet and the size of the first kind of figure.

Still further objects of the present invention are achieved by a relational figure print control processing apparatus, to control printing of a plurality of relational figures over a plurality of printing sheets. The relational figures include a first kind of figure representing an object and a second kind of line figure representing relationship among a plurality of objects. The relational figure print control processing apparatus includes a predetermining printing page unit to determine a plurality of print pages having printing information, by managing printing information for a two dimensional printing area for each print page, wherein the two dimensional printing area is composed of a plurality of print sheets, and each print page corresponds to each print sheet.

In accordance with embodiments of the present invention, the relational figure print control processing apparatus also includes a printing unit to print all of the print pages determined by the predetermining printing page unit having the relational figures.

Still further objects of the present invention are achieved by a relational figure print control processing apparatus, to control printing of a plurality of relational figures over a plurality of printing sheets. The relational figures include a first kind of figure representing an object and a second kind of line figure representing a relationship among a plurality of objects. The relational figure print control processing apparatus includes a printing unit to print a two dimensional position of print page, by managing printing information for a two dimensional printing area of each print page, wherein the two dimensional printing area is composed of a plurality of print sheets, and each print page corresponds to each print sheet having the relational figures.

Still further objects of the present invention are achieved by a relational figure print control processing apparatus to control printing of a plurality of relational figures over a plurality of printing sheets. The plurality of relational figures includes a first kind of figure representing an object and a second kind of line figure representing hierarchy relationship between two objects, wherein the first kind of figure has a corner. The relational figure print control processing apparatus has a predetermining link line position unit to determine whether a first end of the second kind of line figure is positioned at the corner of the first kind of figure based upon whether another object linked by a second end of the second kind of line figure is higher or lower than the first end of the second kind of line figure.

The embodiments of the present invention as described above can alternatively be implemented using a computer program embodied on a computer-readable storage media to control printing of a plurality of relational figures over a plurality of printing sheets by directing a computer.

BRIEF DESCRIPTION OF THE DRAWINGS

These and other objects and advantages of the invention will become apparent and more readily appreciated for the following description of the preferred embodiments, taken in conjunction with the accompanying drawings of which:

FIG. 7 shows a job configuration table which stores job definitions to be utilized by a operation and management system;

FIG. 8 is a data configuration diagram of a printing information table;

DESCRIPTION OF THE PREFERRED EMBODIMENTS

Figure 1A:
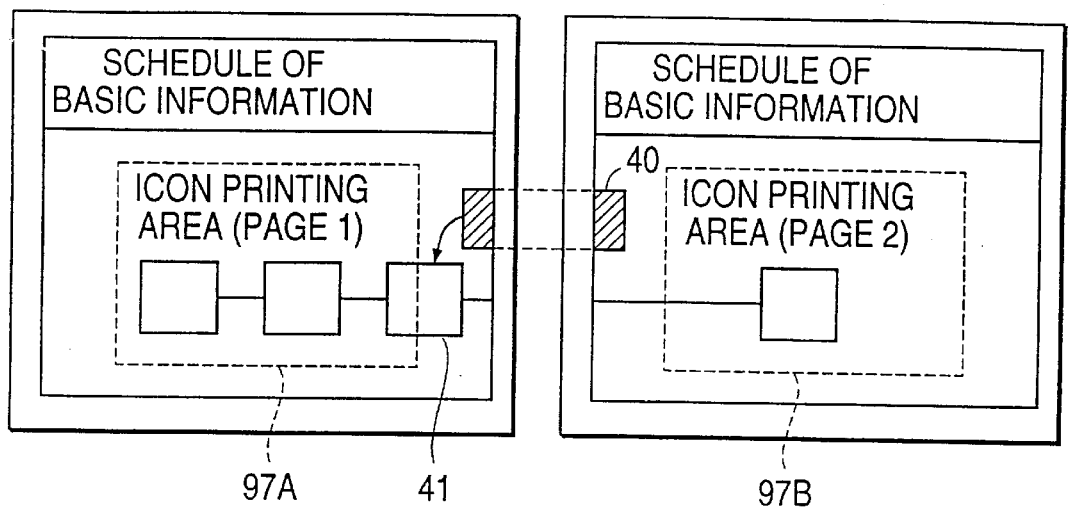
FIGS. 1(A)–(B) show the operating principles of the present invention that item 40 (square icon) represents a job object that would extend over multiple pages.

Reference will now be made in detail to the preferred embodiments of the present invention, examples of which are illustrated in the accompanying drawings, wherein like reference numerals refer to like elements throughout.

Figure 1B:
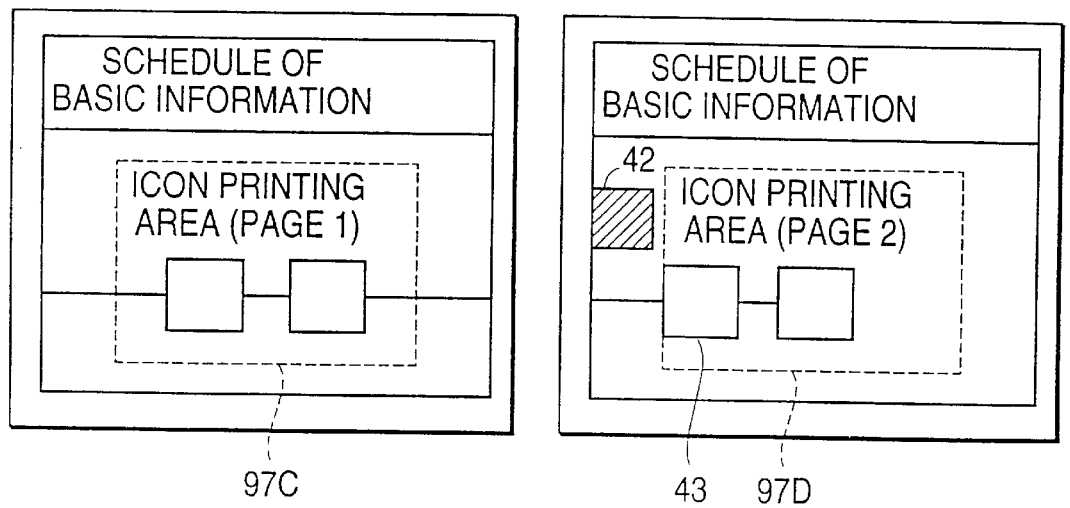

FIGS. 1(A)–(B) shows the operating principles used in the present invention. Item 40, shown in FIG. 1(A), is a square icon which designates a job object that would extend over multiple pages if the data to be shown is printed as shown in the display. Item 40 is changed for printing to position 41, which may include a part of item 40 in an icon printing area 97A. In addition, an area just greater than that of item 40 is deducted from the icon printing area 97A.

FIG. 1(B) shows that although item 42 (square icon) designating the object is printed accurately, the intersection of the object and the line showing its relationship with another object is not printed. In order to make the number of other relative objects known, the printing position of the icon is changed to position 43 so that it may be included in the icon printing area 97D.

With respect to outputting multiple sheets that present relationships between the objects in an easily understandable manner, this problem may be resolved as follows:

1) Predetermining the position of the object showing the first kind of figure (a job object icon), such that the first kind of figure showing a job object is positioned within the printing area of the printing sheet; and 2) Predetermining the position of the connecting portion with a second kind of figure (a connection line) showing a line indicating the relationship between the objects connected with the first kind of figure to be included within the printing area.

The problem of not outputting any sheet printed with figures showing job objects or lines showing relationships with other objects may be solved by predetermining the page characteristics. This entails managing the printing of pages where one printing sheet is a unit and creating a second printing dimension composed of multiple printing sheets in both the longitudinal and lateral directions. This management function would also include managing both kinds of figures and controls to print the printed page only.

The problem of making it easy to combine multiple printed papers into one sheet may be solved by predetermining the printed page characteristics. This would entail managing printing pages where one printed sheet is one unit and a second dimensional printing area is composed of multiple printing sheets in the longitudinal and lateral directions. It also necessitates including the information showing the longitudinal and lateral directions of the printed pages when printing the first or second kind of figure and controls so as to print the printed page only.

The problem of outputting relationship lines in a manner where job hierarchy is easily distinguishable may be solved by predetermining the positions of the link lines. This further entails determining the connecting position between the first kind of figure (a job object icon) showing the object to be processed and the second kind of figure (a connection line) at a corner of the first kind of figure or at any part other than the corner, depending upon whether the relationship between the object and another object to be connected is at an upper rank or a lower rank of the object to be processed.

Preferred Embodiment

Figure 2:
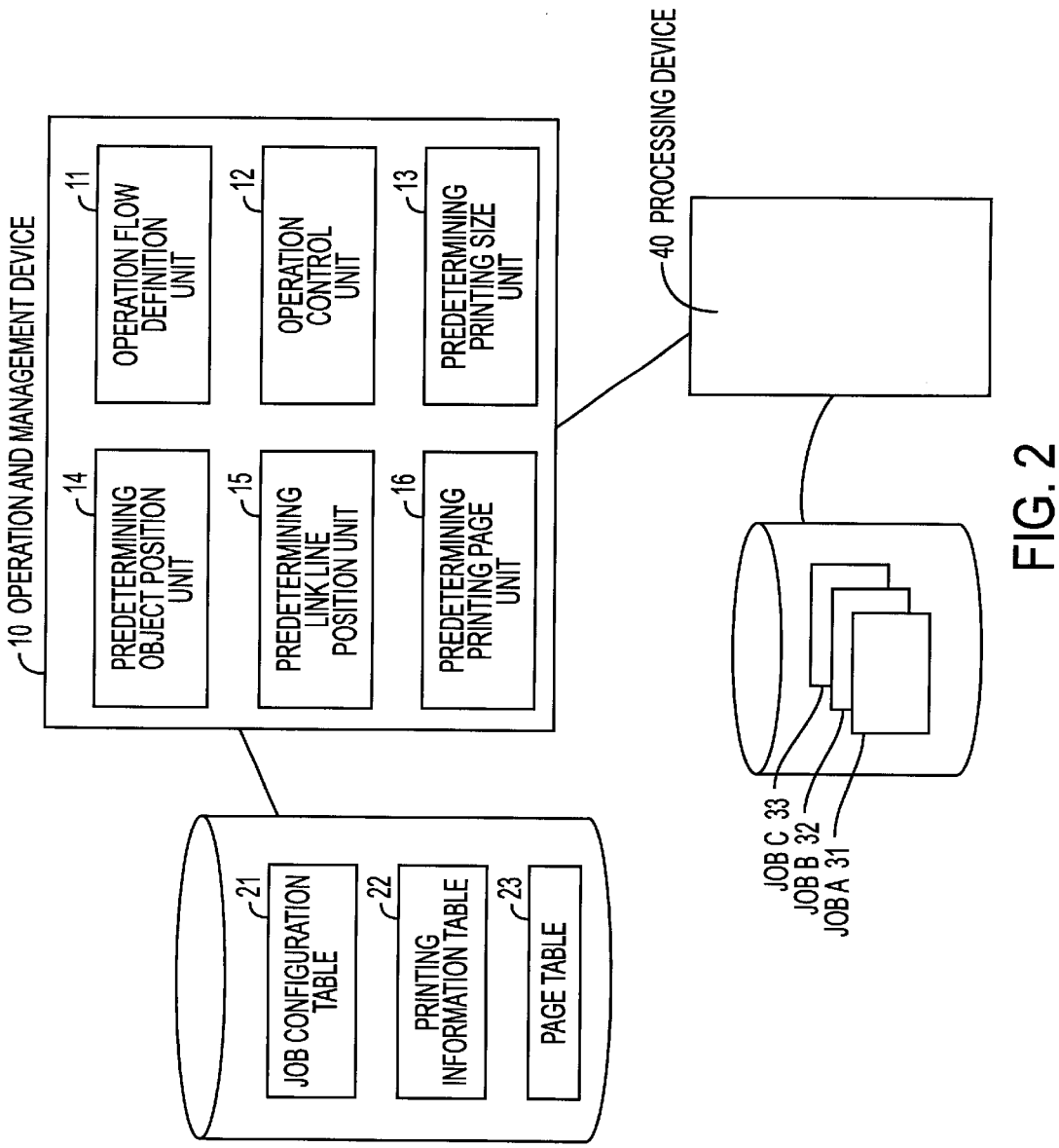
FIG. 2 is a system configuration of the preferred embodiment of the present invention.

FIG. 2 shows a system configuration of the preferred embodiment of the present invention. Reference numeral 10 designates an operation and management device for jobs A, B, and C (31, 32, and 33) to be executed by processing device 40.

Using operation flow definition 11, device 10 lets an operator define job names for various operations, schedule job times, and define relationships to preceding jobs. This information is then placed into job configuration table 21. Operation control consists of 12 executable controls (operations) of jobs A, B, and C (31, 32, and 33) in processing device 40 in accordance with the contents of job configuration table 21.

A predetermining object position unit 14 provides a mechanism of predetermining a position of the object so as to predetermine a printing position of an icon showing the object as the job when outputting the job flowchart to a printer in accordance with the job configuration table 21.

As shown in FIG. 2, the predetermining object position unit 14 predetermines the printing position of the object such that a part of each object (icon) is included in the icon printing area where the part of not less than the object (icon) is deducted from both edges of the printing area of the sheet, as shown in FIG. 1(A)–(B). The printing position of the object obtained by the predetermining object position unit 14 is stored in a printing information table 22, and an actual printing process carries out printing using the contents of the printing information table 22.

A predetermining printing size unit 13 creates the printed area of a sheet to be printed and predetermines the size of the icon representing the object. The size of the print area is considered by the predetermining printing size unit 13 in determining the size of the icon printing area.

Figure 11:
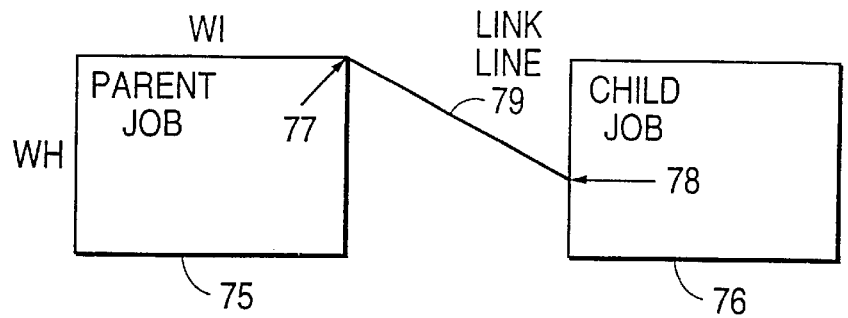
FIG. 11 shows the relationship between a icon and a link line.

A predetermining link line position unit 15 is used to determine the position of a link line and to predetermine the start and end points of a line (link line) which shows the relationship between two objects (icons). If another object is a parent job (preceding job), center point 78 on the side of the object is, as shown in FIG. 11, a connecting position with the line. If another object is a child job (subsequent job), corner 77 of the object is a connecting position with the line. The printing position of the link line obtained by predetermining link line position unit 15 is stored in print information table 22.

A predetermining printing page unit 16 predetermines a page to be printed to allow only pages including information of the printing page predetermined by the predetermining object position unit 14 and predetermining link line position unit 15 to be printed. This page information is stored in a page table 23.

Figure 3:
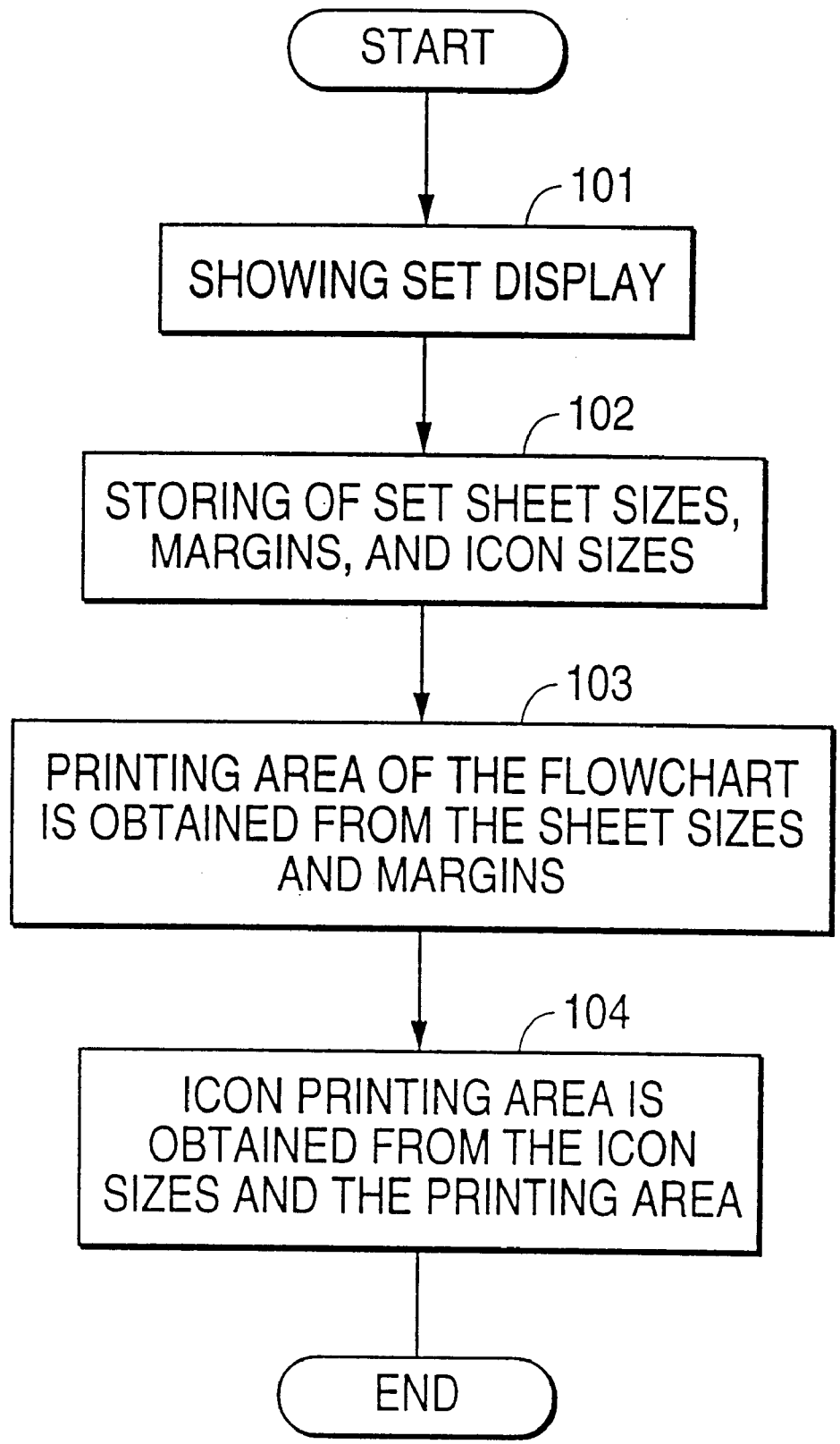
FIG. 3 shows a predetermining printing size flowchart used to determine a page size.
Figure 4:
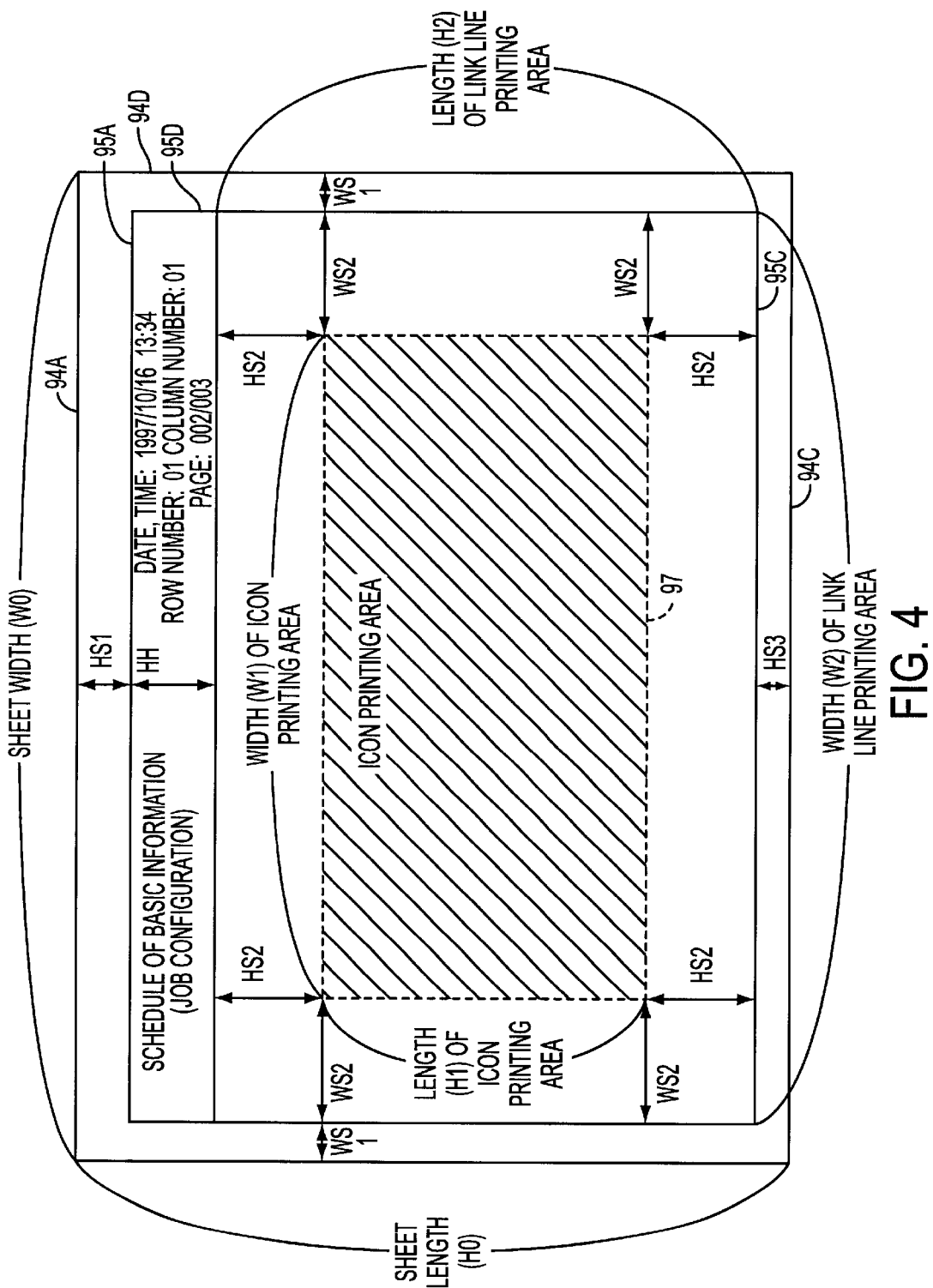
FIG. 4 shows the relationship between the printing area and the sheet.

The process for predetermining page sizes to be printed will be explained in detail below. FIG. 3 shows the process steps used to determine a page size. FIG. 4 is used to illustrate the print area on a sheet.

Referring to FIG. 3, Step S101 shows the right, left, upper, and lower margins, printing sizes, and icon sizes showing the job in the display set by an operator. Step S102 stores the above set printing sizes, margins, and icon sizes set by the operator. In Step S103, the printing area of the link lines of the job flowchart is obtained from the sheet sizes and margins.

FIG. 4 shows the relationship between the printing area and the sheet sizes and margins. The right and left margins are designated as WS1, the upper margin as HS1, the lower margin as HS3, and the height of the header printing area as HH. This is for a sheet size of H0×W0, where the height H2 of the printing area is determined by H2=H0−HS1−HS3−HH, and the width W2 of the link line printing area is determined by W2=W0−WS1−WS1.

In Step S104 of FIG. 3, the printing area of the icon depicting a job (object) is obtained, based on the above obtained sizes of the printing area and the icon.

When the icon size is HS2×WS2, the height H1 of the icon printing area 97 is determined by H1<=H2−HS2−HS2, and the width W1 of the icon printing area 97 is determined by W1<=W2−WS2−WS2.

Figure 5:
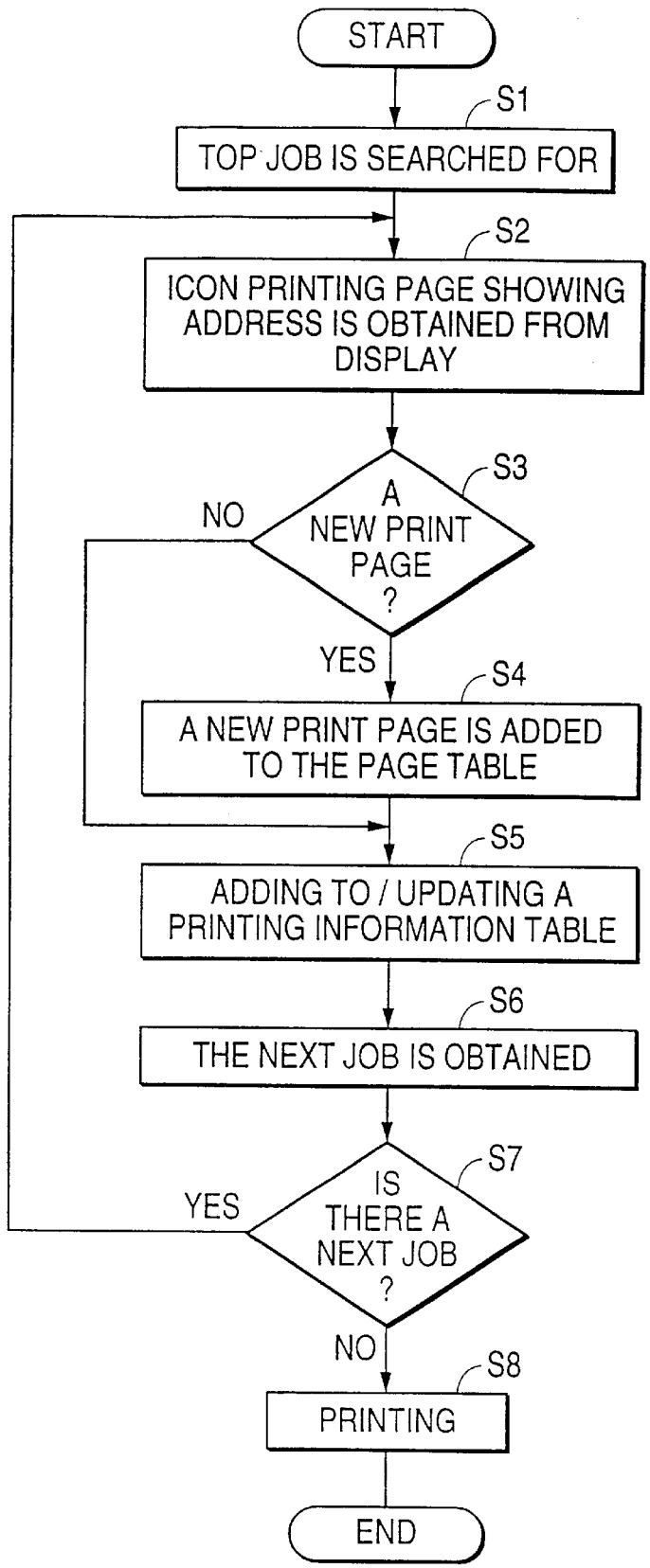
FIG. 5 shows a printing process flowchart used to print a process.
Figure 6:
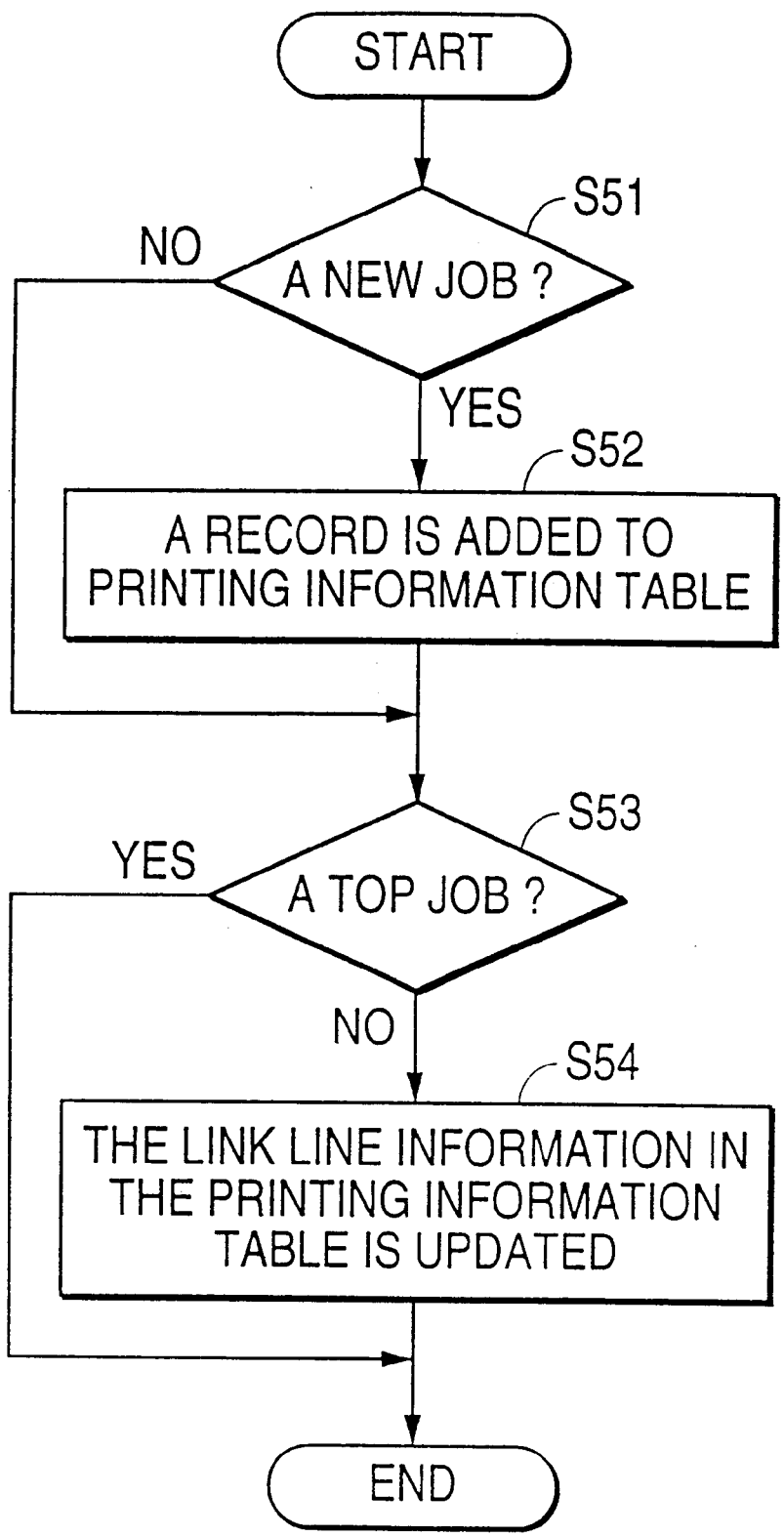
FIG. 6 shows a printing information process flowchart used to predetermine the required printing information.

FIG. 5 shows the flow of processing for a printing process. FIG. 6 shows the processing flow for predetermining the required printing information. These two operations use several tables (or files) in the process execution including: the job configuration table shown in FIG. 7; the print information table shown in FIG. 8; and the page table shown in FIG. 9.

FIG. 7 shows the job configuration table which stores job definitions to be utilized by the operation and management system. The job configuration table stores the job names (preceding job names) which determine the conditions of the job and which should have been executed in advance of the job in question.

The job flow is displayed or printed according to the relationship between each job of the job configuration table and the preceding job. However, when shown in the display, this table contains the coordinates showing an icon in response to each of the jobs.

FIG. 8 shows a data configuration diagram of the printing information table, which stores figures to be shown and shows the positions of each printing object as a printing unit.

Figures 9, 10:
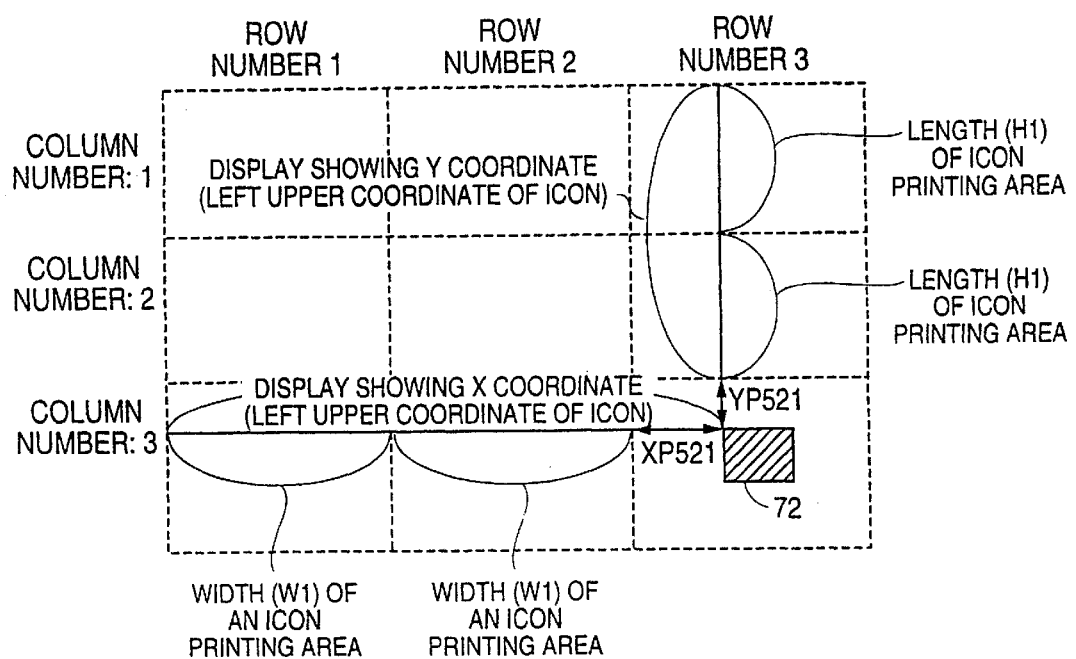
FIG. 9 shows a page table that stores information in which position of a second dimensional coordinate system corresponds to a particular sheet.
FIG. 10 shows the relationship between the display coordinates and the printing coordinates.

FIG. 9 is a page table that stores information on which position of the second dimensional coordinate system corresponds to which sheet. It also manages the positions of the second dimensional coordinate system for each sheet using a start coordinate and an end coordinate as well as row numbers and column numbers.

FIG. 10 shows the relationship between the display coordinates and the printing coordinates. A rectangle enclosed in dotted lines corresponds to one printed sheet. Therefore, nine printed sheets and their display appearance are provided in FIG. 10. From the coordinate (not shown) of the upper left corner of icon 72 in the display, and in view of the sheet size (accurate to the size of the icon printing area), a sheet to be printed with icon 72 is searched for. In this case, the sheet in a row number 3 and a column number 3 is appropriate for printing icon 72. The position of the upper left corner of the icon used in printing is designated by XP521 and YP521, and obtained when the values of the X and Y coordinates in the display of icon 72 are divided by a length in the X direction and a length in the Y direction of the area for printing the icon.

FIGS. 5 and 6 provide a detailed description of the printing process. When a printing instruction is received from an operator, the top (first) job is obtained by referring to the job configuration diagram of FIG. 7 at step S1 of FIG. 5. The top job is that job which has no job to be executed before it. In the example provided in FIG. 7, job A1 is the top job.

In Step S2 of FIG. 5, a page for printing an icon in response to a job request is obtained from the display address of the job contained in the job configuration table. As shown in FIG. 10, a page (sheet) for printing the job is obtained based on the size of the icon printing area from the coordinate of the upper left corner of the icon. Quotients (if there is a remainder, are raised to a unit fraction) obtained when the values of the X and Y coordinates are divided by the length in the X direction and the length in the Y direction of the icon printing area, which are row numbers and column numbers, respectively.

In Step S3 of FIG. 5, it is then determined whether the obtained row numbers and column numbers have already been contained in the page table, and whether it is a new page. In step S4, if a new print page is not yet contained in the page table, it is added.

In the page table there exist columns for the start point (X and Y coordinates) and the end point (X and Y coordinates). The method of calculating these start and end points is detailed below using symbols found in FIG. 4.

| | |
|---|---|
| Page start position = (X coordinate) | width (W2) of the link line printing area × (printing page (column number) − 1). |
| Page start position = (Y coordinate) | length (H2) of the link line printing area × (printing page (printing page (row number) − 1). |
| Page end position = (X coordinate) | width (W2) of the link line printing area × printing page (column number). |
| Page end position = (Y coordinate) | length (H2) of the link line printing area × printing page (row number). |

In step S5 of FIG. 5, the printing information for the job is stored in the printing information table. The operation of step S5 is further broken down and detailed in FIG. 6.

Referring to FIG. 6, in Step S51 a determination is made whether a job to be processed is to be saved in the printing information table. The printing information table contains printing information on each object to be printed (e.g., icon, link line).

The printing object icon designates a job, and a link line designates the relationship between two jobs. The printing information table of FIG. 8 has no data to show a response between the icon and the job. However, the job configuration table has pointers to the printing information in response to each of the jobs. The objects in FIG. 8 indicate figures to be printed (print objects), while the objects explained so far refer to objects showing the relationship in the related figures of the jobs in the flowchart.

Therefore, the job configuration table is searched using a key made from the name of jobs to be processed and determines whether the job configuration table has a pointer to the printing information table. If the job configuration table does not have a pointer then, in step S52 of FIG. 6, printing information where the printing object is created and an icon are established in the printing information table, and pointers to the printing information are generated in the job configuration table. If the printing information table has a relevant record, the link line from Step S53 is processed.

The information to be set as the icon printing information consists of the row numbers, the column numbers of the pages for printing the icons obtained above, and the relative address (address raised at the upper left point of the link line printing area) of the upper left corner of the icon within the printing page. The coordinate of the upper left corner within the printing page is attained by first obtaining coordinates within the icon printing area and adding a blank space to the coordinates as detailed below using symbols found in FIG. 4.

| | |
|---|---|
| Coordinate = (X coordinate) in the icon area | display showing address (X coordinate) – Width (W1) of the icon printing area × (page (row number) – 1). |
| Relative address = (X coordinate) within page | coordinate in the icon area + Lateral blank space (WS2). |
| Coordinate = (Y coordinate) in the icon area | display showing address (Y coordinate) – Height (H1) of the icon printing area × (page column number) – 1). |
| Relative address = (Y coordinate) within page | coordinate in the icon area + Longitudinal blank space (HS2). |

Execution proceeds to process the link line printing information. The job configuration table is searched by turning the names of jobs to be processed into keys. At Step S53 of FIG. 6, a searched job is also checked to see whether it is the top job. If it is the top job, it does not have any link line information in the icon corresponding to it.

If the job to be processed is not a top job, link information is set up in Step S54. Information on the parent job as an access to this process and the printing information of the link line between the parent job of the access and the job to be processed are stored.

The process for obtaining the printing information for the link line is described in detail below.

(1) When the job to be processed and the parent job are present in the same printing page, one link line is added to the record of the printing information table corresponding to the job. The start and end addresses of the link line are obtained from the following formulae and contained in columns of non input link line of the record.

| | |
|---|---|
| Start address (X coordinate) = | relative address (X coordinate) of the upper left corner of the parent job + width of icon. |
| Start Address (Y coordinate) = | relative address (Y coordinate) of the upper left corner of the parent job. |
| End address (X coordinate) = | relative address (X coordinate) of the upper left corner of the job to be processed. |
| End address (Y coordinate) = | relative address (Y coordinate) of the upper left corner of the job to be processed + icon length/2. |

Figure 12:
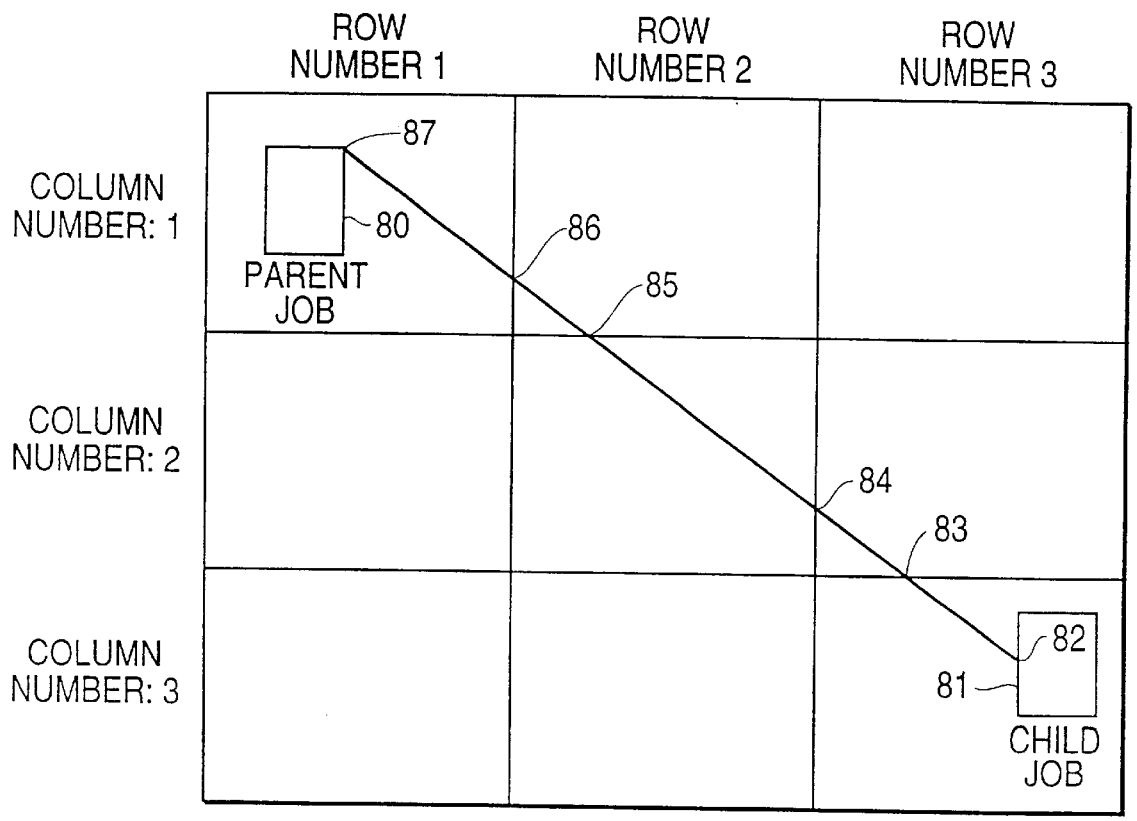
FIG. 12 shows link line printing between two jobs.

(2) When the job to be processed and the parent job are on different printing pages, one link line is added to the record of the printing information table corresponding to the job. As shown in FIG. 12, the start and end addresses (87 and 82, respectively) and the crossing points (83, 84, 85, and 86) between the straight lines of addresses 87 and 82 and the boundary lines (accurate to the boundaries of the link line printing areas) of the pages are obtained. End address 82 and crossing point 83 (the start address) with the boundary of the same page are contained in the column of the link line that has not yet input the corresponding record to the job to be processed.

With respect to the remaining line segments (83–84, 84–85, 85–86, and 86–87), new records are created based on the number of line segments where the classification of the printing objects is the link line in the printing information table and contains the column number, row number, starting address, and ending address. It is then determined whether a page to be drawn with a link line is a new print page. If it is a new page, then this new page is added to the page table by the same process as in Steps S3 and S4.

The above refers to the process of setting the printing information. The next job is then obtained at Step S6 of FIG. 5. If another job exists, processing starting at Step S2 is repeated through Step S7.

Figure 13:
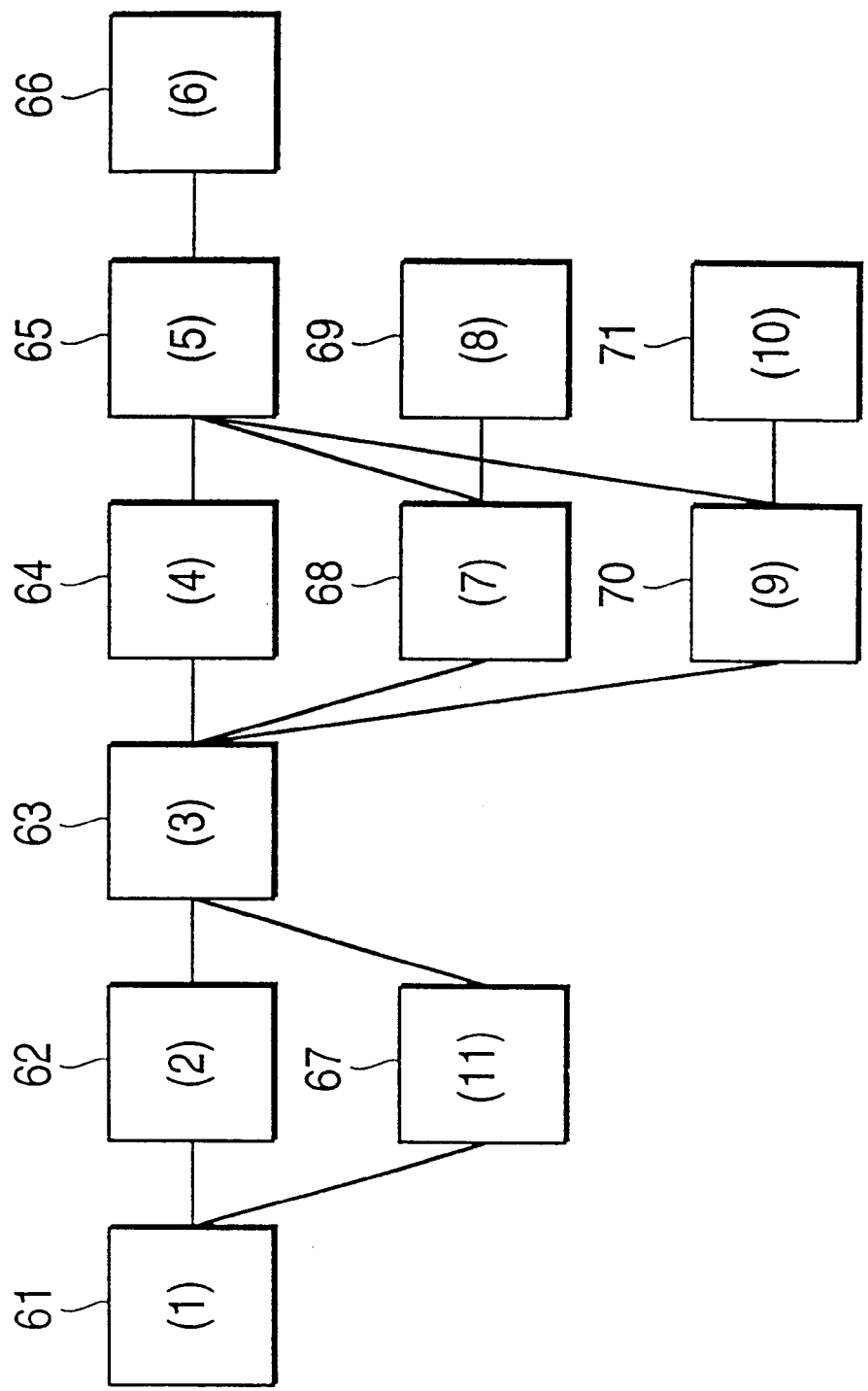
FIG. 13 shows an object search order.

Another way of obtaining the next job is shown in FIG. 13. The square figures are jobs and the square figure at the left side of FIG. 13 is the top job. The numbered figures within parentheses indicate the search order. The process begins by advancing in the forward direction. Upon reaching the end, the process reverses direction until reaching jobs having multiple child jobs. If the child job has not yet been processed, the search reverses back to the forward direction.

The above processing order is carried out according to the job configuration table, as shown in FIG. 7. After the top job A1 has been processed, job A2 will be processed, where A1 is the preceding job. Thus, the process goes to job A5, where job A2 is the preceding job, and to job A6, where job A5 is the preceding job. Upon reaching the end (no job where A6 is the preceding job), a job in which A5 as an address is the preceding job determines whether a nonprocessed job exists. If no such job exists, a job in which A1 as an address of A2 is the preceding job determines whether a nonprocessed job exists. Next, job A3 is obtained.

Figure 14:
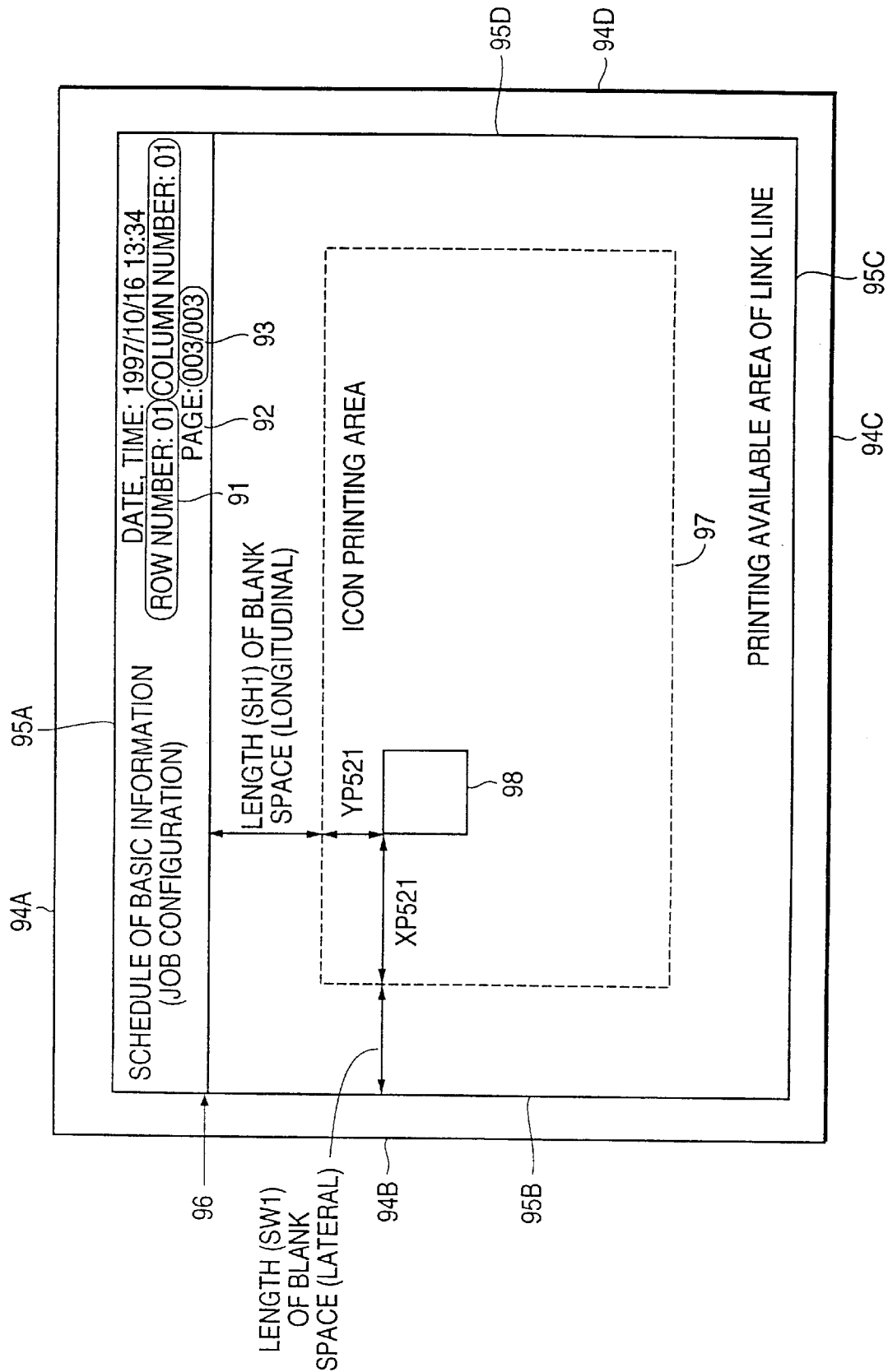
FIG. 14 shows an example of a printed flowchart.

When the above process has been completed for all jobs, printing is performed in Step S8 of FIG. 5 by a printing unit according to the contents of the printing information table, which was setup previously. The printing unit first refers to the page table to get the top of page information and then acquires the icons and link lines (of the same column and row number) corresponding to the first page from the printing information table. Printing is then carried out. At this time, the total number of pages and pages present are printed as item 93 in FIG. 14, and the column and row numbers corresponding to this page are printed as items 91 and 92 of the same.

Figure 15:
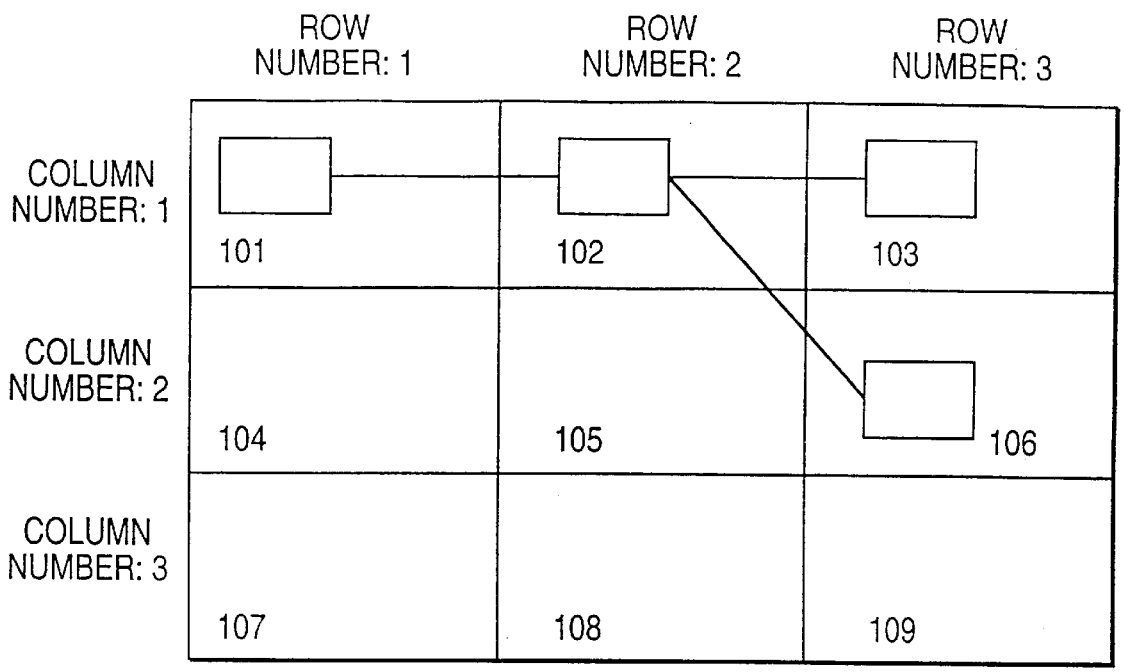
FIG. 15 shows how the page to be printed is determinal.
Figure 16A:
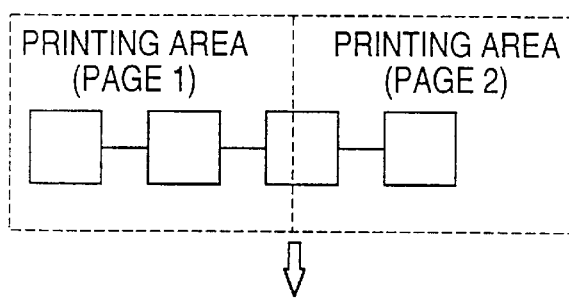
FIG. 16(A) is used to explain the prior art.
Figure 16B:
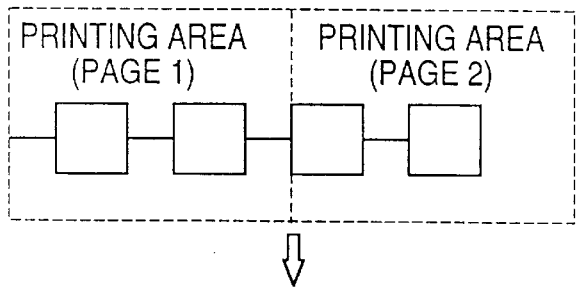
FIG. 16(B) is also used to explain the prior art.

After printing the first page, the information for the next page is taken from the page table, and the above process is performed again. When a flowchart as shown in FIG. 15 is printed, only those pages (101, 102, 103, 105, and 106) having printing objects are printed.

Using the above described preferred embodiment of the present invention, job flowcharts can be printed on multiple sheets of paper in an understandable manner. Further, those sheets not having job figures or lines showing relationships with other jobs can be excluded from being printed. Since a sheet with its related figures is printed with information designating its location in the entire figure, it is easy to combine multiple sheets into one sheet. Though many lines may be present, indicating relationships with other jobs, it is easy to determine the job hierarchy.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A relational figure print control processing apparatus, comprising:
   a plurality of relational display objects interconnected by connection lines representing connectional relationships between the display objects;
   a predetermining object position unit determining positions of the display objects on a plurality of printing sheets, the predetermining object position unit relocating one of the display objects overlapping two of the printing sheets to one of the two printing sheets, the one of the two printing sheets receiving the relocated display object being a first printing sheet and the other of the two printing sheets being a second printing sheet; and a connection portion being placed by the predetermining object position unit on the first printing sheet and being connected to the relocated display object to represent a connection between the relocated display object on the first printing sheet and another related display object on the second printing sheet.

2. A relational figure print control processing apparatus as recited in claim 1, wherein the predetermining object position unit positions the relocated display object within a first figure area of the receiving printing sheet, the first figure area being calculated by deducting the size of the relocated display object from an edge of a printable area of the receiving printing sheet.

3. A relational figure print control processing apparatus as recited in claim 2, further comprising:

a setting means for storing a size of the receiving printing sheet; and a predetermining printing size unit determining a size of the first figure area based upon the size of the receiving printing sheet and the size of the relocated display object.

4. A relational figure print control processing apparatus as recited in claim 2, further comprising:

a setting means for storing a size of the relocated display object; and a predetermining printing size unit determining the size of the first figure area based upon the size of the receiving printing sheet and the size of the relocated display object.

5. A relational figure print control processing apparatus as recited in claim 1, wherein the connection lines represent a hierarchical relationship between two of the display objects, and the display objects have a corner, and further comprising:

a predetermining link line position unit determining whether a first end of the connection line is positioned at the corner of the display object based upon whether another display object linked by a second end of the connection line is higher or lower than the first end of the connection line.

6. A computer-readable storage controlling a computer and comprising a process of:

determining positions of a plurality of relational display objects, the display objects being interconnected by connection lines representing connectional relationships between the display objects, on a plurality of printing sheets;

relocating one of the display objects overlapping two of the printing sheets to one of the two printing sheets, the one of the two printing sheets receiving the relocated display object being a first printing sheet and the other of the two printing sheets being a second printing sheet; and placing a connection portion on the first printing sheet and connecting the connection portion to the relocated display object to represent a connection between the relocated display object on the first printing sheet and another related display object on the second printing sheet.

7. A computer program as recited in claim 6, wherein the connection lines represent a hierarchical relationship between two of the display objects, and the display objects have a corner, and further comprising:

a predetermining link line position unit determining whether a first end of the connection line is positioned at the corner of the display object based upon whether another display object linked by a second end of the connection line is higher or lower than the first end of the connection line.

8. A method for controlling the printing of relational figures, comprising:

determining positions of a plurality of relational display objects, the display objects being interconnected by connection lines representing connectional relationships between the display objects, on a plurality of printing sheets;

relocating one of the display objects overlapping two of the printing sheets to one of the two printing sheets, the one of the two printing sheets receiving the relocated display object being a first printing sheet and the other of the two printing sheets being a second printing sheet; and placing a connection portion on the first printing sheet and connecting the connection portion to the relocated display object to represent a connection between the relocated display object on the first printing sheet and another related display object on the second printing sheet.

9. A relational figure print control processing apparatus, to control printing of a plurality of relational figures having one or more first figures representing display objects and one or more second figures representing connecting relationships among the display objects, comprising:

a predetermining object position unit determining object position information of all the first figures on a plurality of printing sheets so that if any of the first figures are determined to overlap two or more printing sheets, the overlapping first figures are repositioned to be contained within a single printing sheet and a connection portion between each repositioned first figure and a corresponding second figure is located within the single printing sheet;

a predetermining link line position unit determining link line position information based on whether a first end of the second figure is positioned at the corner of the first figure based upon whether another display object linked by a second end of the second figure is higher or lower than the first end of the second figure; and a predetermining printing page unit determining a plurality of print pages based on the object position information and link line position information for a two dimensional printing area for each of the plurality of printing sheets.

10. A relational figure print control processing apparatus, to control printing of a plurality of relational figures having one or more first figures representing display objects and one or more second figures representing connecting relationships among the display objects, comprising:

a predetermining object position unit determining object position information of all the first figures on a plurality of printing sheets so that if any of the first figures are determined to overlap two or more printing sheets, the overlapping first figures are repositioned to be contained within a single printing sheet and a connection portion between each repositioned first figure and a corresponding second figure is located within the single printing sheet;

a predetermining link line position unit determining link line position information based on whether a first end of the second figure is positioned at the corner of the first figure based upon whether another display object linked by a second end of the second figure is higher or lower than the first end of the second figure;

a predetermining printing size unit determining a size of a first figure area based upon the size of a single printing sheet and a size of the first figure; and a predetermining printing page unit determining a plurality of print pages based on the object position information, the link line position information, and the size of the first figure area for a two dimensional printing area for each of the plurality of printing sheets.

* * * * *

UNITED STATES PATENT AND TRADEMARK OFFICE
CERTIFICATE OF CORRECTION

PATENT NO. : 6,337,748
DATED : January 8, 2002
INVENTOR(S) : Noriaki Murata et al.

It is certified that error appears in the above-identified patent and that said Letters Patent is hereby corrected as shown below:

<u>Title page, item [57],</u>
ABSTRACT,
Line 13, delete "the" (second occurrence).

Signed and Sealed this

Seventh Day of May 2002

*Attest:*

*Attesting Officer*

JAMES E. ROGAN
*Director of the United States Patent and Trademark Office*